United States Patent
Ong et al.

(10) Patent No.: US 8,653,156 B2
(45) Date of Patent: Feb. 18, 2014

(54) COMPOSITE MATERIAL HAVING THE APPEARANCE OF NATURAL STONE

(75) Inventors: Ivan W. Ong, Charlotte, NC (US); Gerald W. Walter, Peterborough (GB)

(73) Assignee: Consentino, S.A., Macael Almeria (ES)

( * ) Notice: Subject to any disclaimer, the term of this patent is extended or adjusted under 35 U.S.C. 154(b) by 619 days.

(21) Appl. No.: 10/563,594

(22) PCT Filed: Jan. 30, 2004

(86) PCT No.: PCT/US2004/002712
§ 371 (c)(1),
(2), (4) Date: Jun. 7, 2006

(87) PCT Pub. No.: WO2005/014256
PCT Pub. Date: Feb. 17, 2005

(65) Prior Publication Data
US 2006/0270758 A1    Nov. 30, 2006

Related U.S. Application Data

(60) Provisional application No. 60/486,313, filed on Jul. 11, 2003.

(51) Int. Cl.
*A01N 25/00* (2006.01)
*A01N 25/32* (2006.01)
*A01N 25/34* (2006.01)
*C09D 5/16* (2006.01)

(52) U.S. Cl.
USPC ............ 523/122; 424/405; 424/406; 424/411

(58) Field of Classification Search
USPC ............ 106/16, 400, 738, 817; 424/405, 406, 424/411, 413; 428/540; 523/122
See application file for complete search history.

(56) References Cited

U.S. PATENT DOCUMENTS

| | | | |
|---|---|---|---|
| 3,278,662 A | 10/1966 | Mangrum | |
| 3,670,060 A | 6/1972 | Cuffaro et al. | |
| 3,847,865 A * | 11/1974 | Duggins et al. | 524/437 |
| 4,595,626 A | 6/1986 | Brubaker | |
| 4,698,010 A | 10/1987 | Toncelli | |
| 5,321,055 A | 6/1994 | Slocum | |
| 5,536,345 A | 7/1996 | Lingart | |
| 5,800,752 A | 9/1998 | Charlebois | |
| 6,136,226 A | 10/2000 | Sakai | |
| 6,387,985 B1 | 5/2002 | Wilkinson et al. | |
| 6,663,877 B1 * | 12/2003 | Appleton et al. | 424/411 |
| 6,750,283 B1 * | 6/2004 | Sakai et al. | 524/492 |
| 2003/0087074 A1 | 5/2003 | Yamanashi et al. | |
| 2003/0096545 A1 * | 5/2003 | Payne | 442/123 |

FOREIGN PATENT DOCUMENTS

| | | | | |
|---|---|---|---|---|
| EP | 1428806 | * | 6/2004 | |
| JP | 7-292288 | | 11/1995 | |
| JP | 10-265250 | | 10/1998 | |
| JP | 2000-1659730 | | 6/2000 | |
| WO | WO/00/23524 | * | 4/2000 | C08K 3/34 |

OTHER PUBLICATIONS

Schweizer et al., "Triclosan: a widely used biocide and its link" FEMS Microbiology Letters. 202. (2001). pp. 1-7.*

* cited by examiner

*Primary Examiner* — Jonathan Langman
(74) *Attorney, Agent, or Firm* — Sughrue Mion, PLLC

(57) ABSTRACT

Disclosed is a composite material having the appearance of natural stone that made from a polymer and natural aggregate. The composite material also has an antimicrobial material incorporated into it that resists the proliferation of microbes on the surface of the material. A method for producing this material is also disclosed.

19 Claims, No Drawings

COMPOSITE MATERIAL HAVING THE APPEARANCE OF NATURAL STONE

CROSS-REFERENCE TO RELATED APPLICATION

This application is National Stage of International Application PCT/US2004/002712 filed Jan. 30, 2004, which claims benefit of U.S. Provisional Application No. 60/486,313, filed Jul. 11, 2003; the disclosures of each are all incorporated herein by reference in their entireties.

BACKGROUND OF THE INVENTION

The invention relates to the production of a composite material comprising a filler and a polymeric material that exhibits antimicrobial properties. The invention relates more particularly to a material having the appearance of marble and/or granite with improved properties as compared to other natural or synthetic materials. Such materials are often used to provide surfaces such as tabletops and countertops that are susceptible to the growth of unwanted bacteria.

Polished natural stones, such as marble or granite and other igneous forms of crystalline silica or siliceous rock, are often used as decorative and functional facing and surfaces in long-lasting construction applications. However, these products require expensive handling in shaping and finishing and are only available from relatively few geographical regions. These factors significantly add to the already high cost of employing such materials. Additionally, due to natural imperfections, cracking and general brittleness can be encountered by builders working with natural stone.

Another issue with natural stone is that it can be quite porous and can absorb liquids that come into contact with it. This tendency to absorb liquid can lead to staining and water marking upon use. Absorbance of liquid can also provide the moist environment that favors bacterial growth.

In an attempt to avoid the problems inherent in natural stone products, various synthetic-filled polymeric compositions have been developed for use in applications such as countertops, floors, and architectural facings. These synthetic materials are commercially available. Typically, these materials incorporate a polymeric resin and inorganic fillers, and are cured using curing systems that are actuated at room temperature or at elevated temperatures. One drawback of these compositions is that they lack aesthetic appeal with consumers that consider the look of natural stone to exemplify high quality and taste.

Accordingly, many attempts have been made to develop products having the pleasing aesthetic appearance of natural products. Certain synthetic products have become available which provide the appearance of natural stone, especially marble and granite, at a fraction of the cost of solid stone. These so-called cultured stone products are man-made molded products generally consisting of resin highly filled with natural aggregate, inorganic particles and/or pigments.

One such product is described in U.S. Pat. No. 3,278,662 to Mangrum. This reference describes a stone-containing tile product which can be mass-produced, and used to avoid the problems that generally face the installer of terrazzo products. The tile product as disclosed therein contains about 7 to about 25 percent by weight of a thermosetting polyester resin, and about 93 to about 75 percent by weight of stone particles. The components are compressed in a mold and cured; the resulting products are rigid in nature and have deficiencies that are similar to those noted with ceramic and marble tile products.

Another procedure commercialized by Breton S.p.A. of Castello di Godego, Italy, and commonly known as the "Breton Stone" process, has found commercial success in this area. In this technology, conventional polyester resin precursors are blended at low weight percentages with aggregate to provide a relatively dry mass of material that is vibro-compacted under vacuum and then cured to yield a rigid tile product. A process used to practice this technology is disclosed by Toncelli in U.S. Pat. No. 4,698,010. A specific polyester resin that can be used in this technology is disclosed by Slocum in U.S. Pat. No. 5,321,055. Other patents related to this technology are U.S. Pat. Nos. 5,264,168; 5,800,752; and 6,387,985.

The growing popularity of artificial stone products has resulted in the increased use of such products in home and business construction. The most common application for artificial stone is as a replacement for solid stone countertops and tabletops. Artificial stone is also used in architectural facings, walkways, home furnishings, patio furniture, decorative stones, indoor and outdoor tile, flooring, wall coverings, mantles, bathroom fixtures, and imitation stone structures.

One thing that all of these uses have in common is that they place the artificial stone in aesthetically important areas and in close proximity to human activity. These are also areas where the growth of bacteria, mold, mildew, and fungus is highly undesirable. Countertops and tabletops are two uses where such growth is especially undesirable given their close proximity to food preparation.

Although these synthetic stone replacements are superior to stone in a number of ways they still possess some of the deficiencies that are inherent in products made from natural stone. One such deficiency is the porosity of natural stone. Natural stone and aggregates thereof are porous and tend to absorb water which can lead to staining similar to that which occurs with natural stone slabs. The water absorbed by the stone particles also provides a moist environment suitable for growth of microorganisms that can stain the product, produce slick and dangerous surfaces, produce unwanted odors, contaminate food, act as a cross-contamination vector, and promote illness.

The porosity and rough surface of natural aggregate has led many producers of artificial stone to add a gel coat to the surface of their products. Although these gel coats add a degree of water repellency to the finished products, they can be damaged from harsh cleaning chemicals and they may not completely seal the underlying porous aggregate.

In short, the increased use of artificial stone products in countertops, tabletops and other areas of high human contact has generated a need for reducing or eliminating the potential for growth of microorganisms on the surface of the artificial stone.

Accordingly, it is an object of the present invention to provide an improved composite material having an appearance similar to that of natural stone that reduces or eliminates the presence of microbes on the surface of the material. It is another object of this invention to provide for such a material in a cost effective manner suitable for widespread commercial use.

DETAILED DESCRIPTION

The present invention is applicable to a variety of polymer composites comprising natural aggregates such as calcium carbonate, marble, granite, quartz, feldspar, quartzite and mixtures thereof. Such composites are increasingly used as substitutes for solid slabs of natural stone because they are more cost effective and can be engineered to achieve specific structural and aesthetic characteristics.

As used herein, the term "natural aggregate" primarily means crushed natural stone and minerals. Specifically, the term "natural aggregate" will be understood to include aggregates comprising calcium carbonate, marble, granite, quartz, feldspar, quartzite and mixtures thereof. Likewise, the term "filler" will be understood to include materials often added to give bulk and strength to polymeric composites. Such "fillers" include fumed silica, sand, clay, fly ash, cement, broken ceramics, mica, silicate flakes, broken glass, glass beads, glass spheres, mirror fragments, steel grit, aluminum grit, carbides, plastic beads, pelletized rubber, ground polymer composites (e.g., acrylics encasing copper filings), wood chips, sawdust, paper laminates, pigments, colorants, and mixtures thereof.

In broad terms, the invention is an improvement on a structural material having an appearance similar to natural stone. Such material is commercially available from Breton S.p.A. of Castello di Godego, Italy, and is commonly known as "Breton Stone". In one of the invention's most basic embodiments, it is a composite structural material having an appearance similar to that of natural stone. The material comprises a natural aggregate, a polymeric binder, and an antimicrobial agent. The material may also comprise a curing agent and one or more fillers.

The invention also encompasses a method for making the claimed composite material. The claimed method is an improvement upon the Breton Stone process. In broad terms, the claimed process comprises the steps of obtaining a natural aggregate of appropriate dimension, combining the aggregate with a polymeric binder to form an aggregate and binder mixture, distributing the mixture in a mold, and curing the mixture by application of heat and pressure and vibration.

Turning now to the specifics of the claimed process, the variables inherent in the Breton Process (e.g., the type and quantity of natural aggregate used, the type and quantity of polymeric binder, the use of fillers, the thickness of the end product, etc.) prevent a thorough discussion of every possible permutation of variables. However, those skilled in the art are familiar with the basic concepts of the Breton Stone process and the manipulation of the various variables to achieve desired results. Accordingly, those skilled in the art are readily capable of taking the teachings of the invention described herein and modifying them and the underlying Breton Process to achieve a desired result without undue experimentation. Nevertheless, the following discussion is offered as an example of how the invention may be incorporated into a typical Breton Stone process. The following discussion is exemplary and should not be interpreted as unduly limiting the scope of the invention.

In accordance with the present invention, polymer composite materials are manufactured in a streamlined process. Natural aggregate of appropriate dimension, polymeric binder, and an antimicrobial agent are mixed and distributed in a mold and then subjected to simultaneous application of vibration, heat and pressure to cause the polymer binder to cure rapidly. A curing agent is often added to the mixture to enhance the curing step and speed up the overall process. Each aspect of this process will now be explored in more detail.

The natural aggregate suitable for use in the invention includes crushed natural stone and minerals. In preferred embodiments the natural aggregate is selected from the group consisting of calcium carbonate, quartz, granite, feldspar, marble, quartzite, and mixtures thereof. Marble, granite, and quartz are particularly preferred. The size of the individual aggregate particles may vary depending upon the end use of the composite material and is ultimately limited by the size of the molding apparatus used. Suitable apparatus, such as those discussed in U.S. Pat. Nos. 4,698,010 and 5,800,752, are commercially available and will not be discussed in detail herein. In most processes the average size of the individual aggregate particles is kept below about 100 mm, preferably below about 25 mm, and most preferably below about 10 mm. Aggregate with an average particle size between about 1 mm and 3 mm are particularly preferred.

Similarly, the relative amount of natural aggregate in the composite material may vary depending upon the end use of the product. In most instances the natural aggregate will comprise between about 85% and about 96% by weight of the final composition. Percentages lower than 85% typically result in product that does not appear like natural stone. Above 96% aggregate there is usually not enough binder present to provide a commercially acceptable product. In preferred embodiments the natural aggregate will comprise between about 89% and about 93% by weight of the cured composition.

In addition to the natural aggregate, a filler may be added to the aggregate and binder mixture. The filler may encompass any traditional material added to polymer mixtures to add bulk and strength to the mixture. Common fillers suitable for use with the invention include fumed silica, sand, clay, fly ash, cement, broken ceramics, mica, silicate flakes, broken glass, glass beads, glass spheres, mirror fragments, steel grit, aluminum grit, carbides, plastic beads, pelletized rubber, ground polymer composites (e.g., acrylics encasing copper filings), wood chips, sawdust, paper laminates, pigments, colorants, and mixtures thereof.

The relative amount of filler used in the practice of the invention is also variable and depends upon the ultimate end use of the product. For tabletop and countertop applications, the quantity of bulky fillers (e.g., clay) is usually low to maintain the appearance of natural stone. On the other hand, fillers such as colorants are often added to the mixture to aid in achieving a uniform surface appearance. In fact, colorants often provide a useful carrier for other fillers and additives such as UV stabilizers which are commonly added to compositions destined for outdoor applications. Given the wide variety of fillers that may be used in the practice of the invention the quantity of filler in the overall composition can vary from 0% or a miniscule amount to about 12% by weight. The filler should not be present in amounts sufficient to reduce the effectiveness of the ultimate end product. Those skilled in the art of the Breton Process know the various considerations that govern the use of fillers in this process.

The polymeric binder utilized in the practice of the invention may be any polymeric binder suitable for securing the chosen natural aggregate. Suitable polymeric binders include substantially any thermosetting resin. The binder may be formed of a polymer, a mixture of polymers (for example, polyester and urethane), monomers, and mixtures of monomers and polymers. Examples of suitable polymers include polyester, vinyl ester, epoxy, phenolic resin, urethane and mixtures thereof. Examples of monomers for the polymeric binder include $\alpha$, $\beta$-ethylenically unsaturated monomers, e.g., styrene and styrene derivatives; lower alkyl substituted styrenes; $\alpha$-methyl styrene; vinyl toluene; divinyl benzene; acrylics; $Cl_{1-8}$ alkyl esters of acrylic and methacrylic acids, e.g., methyl acrylate, ethyl acrylate, isopropyl acrylate, butyl acrylate, 2-ethylhexyl acrylate, methyl methacrylate, ethyl methacrylate, isopropyl methacrylate, and butyl methacrylate; and phenols, furans and the like. These monomers may be used alone or in combination.

Those skilled in the art are fully aware of the unique properties of each of the polymeric binders discussed herein and can readily choose the appropriate binder based upon the requirements of the particular application. One preferred polymer is polyester. The preferred monomers, particularly from the point of view of cost, are styrene, methyl methacrylate and butyl acrylate.

The binder may also include a coupling agent, such as silane, to assist in adhesion between the aggregate and binder. This is especially useful for hard fillers. For example, a polyester binder will bind more effectively to quartz if a silane coupling agent is added to the mixture. A coupling agent may also be used to pretreat fillers, for example glass fibers, prior to addition of binder.

As with the other components of the claimed composite material, the quantity of polymeric binder used in the practice of the invention may vary. In all embodiments of the invention enough polymeric binder is used to provide the structural material with the physical properties (e.g., strength) required for the particular application. In most applications where the intent is to mimic the appearance of natural stone the polymeric binder will be present in an amount between about 4% by weight and about 15% by weight, more preferably between about 6% and 10%. Of course, the type of binder used will have an impact on the quantity of binder used. Those skilled in the art, however, are aware of this and can make the appropriate adjustments where necessary.

In preferred embodiments, the polymeric binder will primarily comprise polyester and will be present in an amount between about 6% by weight and about 10% by weight of the cured composition.

Suitable antimicrobial agents that can be utilized in the practice of the invention include organic and inorganic antimicrobial agents. As will be readily apparent to one of skill in the art, a variety of organic antimicrobial agents are known including, for example, chlorhexidine, alexidine, cetyl pyridinium chloride, benzalkonium chloride, benzethonium chloride, cetalkonium chloride, cetrimide, cetrimonium bromide, glycidyl trimethylammonium chloride, stearalkonium chloride, hexetidine, triclosan and triclocarban. A preferred class of antimicrobial agents is quaternary ammonium compounds, including but not limited to the following compounds:

Fluoride:
Tetra-n-butylammonium Fluoride, Tetraethylammonium Fluoride

Chloride:
Acetylcholine Chloride, (3-Acrylamidopropyl)trimethylammonium Chloride, Benzalkonium Chloride, Benzethonium Chloride, Benzoylcholine Chloride, Benzylcetyldimethylammonium Chloride, N-Benzylcinchonidinium Chloride, N-Benzylcinchoninium Chloride, Benzyldimethylphenylammonium Chloride, Benzyldimethylstearylammonium Chloride, N-Benzylquinidinium Chloride, N-Benzylquininium Chloride, Benzyltri-n-butylammonium Chloride, Benzyltriethylammonium Chloride, Benzyltrimethylamrnmonium Chloride, Carbamylcholine Chloride, DL-Camitine Hydrochloride, Chlorocholine Chloride, (3-Chloro-2-hydroxy-n-propyl)trimethylammonium Chloride, Choline Chloride, n-Decyltrimethylammonium Chloride, Diallyldimethylammonium Chloride, Dichloromethylenedimethylinmnium Chloride, Dimethyldistearylammonium Chloride, n-Dodecyltrimethylammonium Chloride, Girard's Reagent T, n-Hexadecyltnmethylammonium Chloride, Hexamethonium Chloride, Lauroylcholine Chloride, Methacholine Chloride, Methacroylcholine Chloride, (2-Methoxyethoxymethyl)triethylammonium Chloride, [bgr]-Methylcholine Chloride, Methyltriethylammonium Chloride, Myristoylcholine Chloride, n-Octyltrimethylammonium Chloride, Phenyltriethylammonium Chloride, Phenyltrimethylammonium Chloride, Phosphocholine Chloride Calcium Salt, Phosphocholine Chloride Sodium Salt, Succinylcholine Chloride, Tetra-n-amylammonium Chloride, Tetra-n-butylammonium Chloride, Tetradecyldimethylbenzylammonium Chloride, n-Tetradecyltrimethylammonium Chloride, Tetraethylammonium Chloride, Tetramethylammonium Chloride, Trimethyl[2,3-(dioleyloxy)propyl]ammonium Chloride, Trimethylstearylammonium Chloride, Trioctylmethylammonium Chloride, Tri-n-octylmethylaimonium Chloride, Bromide:
Acetylcholine Bromide, Benzoylcholine Bromide, Benzyltri-n-butylammonium Bromide, Benzyltriethylammonium Bromide, Bromocholine Bromide, Cetyldimethylethylamronium Bromide, Choline Bromide, Decamethonium Bromide, n-Decyltrimethylammonium Bromide, Didecyldimethylammonium Bromide, Dilauryldimethylammonium Bromide, Dimethyldimyristylammonium Bromide, Dimethyldioctylammonium Bromide, Dimethyldipalmitylammonium Bromide, Dimethyldistearylammonium Bromide, n-Dodecyltrimethylammonium Bromide, (Ferrocenylmethyl)dodecyldimethylammonium Bromide, (Ferrocenylmethyl)trimethylammonium Bromide, n-exadecyltrimethylammonium Bromide, Hexamethonium Bromide, Hexyldimethyloctylammonium Bromide, n-Hexyltrimethylammonium Bromide, Methacholine Bromide, Neostigmine Bromide, n-Octyltrimethylammonium Bromide, Phenyltrimethylammonium Bromide, Stearyltrimethylammonium Bromide, Tetra-n-amylammonium Bromide, Tetra-n-butylammonium Bromide, Tetra-n-decylammonium Bromide, n-Tetradecyltrimethylammonium Bromide, Tetraethylammonium Bromide, Tetra-n-heptylammonium Bromide, Tetra-n-hexylammonium Bromide, Tetramethylammonium Bromide, Tetra-n-octylammonium Bromide, Tetra-n-propylammonium Bromide, 3-(Trifluoromethyl)phenyltrimethylammonium Bromide, Trimethylvinrylammonium Bromide, Valethamate Bromide.

Iodide:
Acetylcholine Iodide, Acetylthiocholine Iodide, Benzoylcholine Iodide, Benzoylthiocholine Iodide, Benzyltriethylammonium Iodide, n-Butyrylcholine Iodide, n-Butyrylthiocholine Iodide, Decamethonium Iodide, N,N-Dimethylmethyleneammonium Iodide, Ethyltrimethylammonium Iodide, Ethyltri-n-propylammonium Iodide, (Ferrocenylmethyl)trimethylammonium Iodide, (2-Hydroxyethyl)triethylammonium Iodide, [bgr]-Methylcholine Iodide, O-[bgr]-Naphthyloxycarbonylcholine Iodide, Phenyltriethylammonium Iodide, Phenyltrimethylammonium Iodide, Tetra-n-amylammonium Iodide, Tetra-n-butylammonium Iodide, Tetraethylammonium Iodide, Tetra-n-heptylammonium Iodide, Tetra-n-hexylammonium Iodide, Tetramethylammonium Iodide, Tetra-n-octylammonium Iodide, Tetra-n-propylammonium Iodide, 3-(Trifluoromethyl)phenyltrimethylammonium Iodide.

Hydroxide:
Benzyltriethylammonium Hydroxide, Benzyltrimethylammonium Hydroxide, Choline, n-Hexadecyltrimethylammonium Hydroxide, Phenyltrimethylammonium Hydroxide, Sphingomyelin, Tetra-n-butylammonium Hydroxide, Tetra-n-decylammonium Hydroxide, Tetraethylammonium Hydroxide, Tetra-n-hexylammonium Hydroxide, Tetramethylammonium Hydroxide, Tetra-n-octylammonium Hydroxide, Tetra-n-propylammonium Hydroxide, 3-(Trifluoromethyl)phenyltrimethylammonium Hydroxide.

Others:
Acetylcholine Perchlorate, Benzyltriethylammonium Dichloroiodate, Benzyltrimethylammonium Tetrachloroiodate, Benzyltrimethylammonium Tribromnide, Betaine, Betaine Hydrochloride, Bis(tetra-n-butylammonium) Dichromate, Bis(tetra-n-butylammonium) Tetracyanodiphenoquinodimethanide, L-Carnitine, 3-[(3-Cholamidopropyl)dimethylammonio]-1-propanesulfonate, Denatonium Benzoate, n-Dodecyldimethyl(3-sulfopropyl)ammonium Hydroxide, Inner Salt, N-Fluoro-N'-(chloromethyl)triethylenediamine Bis(tetrafluoroborate), n-Hexadecyltrimethylammonium Hexafluorophosphate, n-Hexadecyltrimethylammonium Perchlorate, n-Hexadecyltrimethylammonium Tetrafluoroborate, (Methoxycarbonylsulfamoyl)triethylarunonium Hydroxide, Inner Salt, Neostigmine Methyl Sulfate, n-Octadecyldimethyl(3-sulfopropyl)ammonium Hydroxide, Inner Salt, Phenyltrimethylammonium Tribromide, Propionylcholine p-Toluenesulfonate, Tetra-n-butylammonium Azide, Tetra-n-butylammonium Bifluoride, Tetra-n-butylammonium Borohydride, Tetra-n-butylammonium Bromodiiodide, Tetra-n-butylammonium Dibromoaurate, Tetra-n-butylammonium Dibromochloride, Tetra-n-butylammonium Dibromoiodide, Tetra-n-butylammonium Dichloroaurate, Tetra-n-butylammonium Dichlorobromide, Tetra-n-butylammonium Difluorotriphenylsilicate, Tetra-n-butylammonium Difluorotriphenylstannate, Tetra-n-butylammonium Dihydrogentrifluoride, Tetra-n-butylammonium Diiodoaurate, Tetra-n-butylammonium Hexafluorophosphate, Tetra-n-butylammonium Hydrogensulfate [for Ion-Pair Chromatography], Tetra-n-butylammonium Hydrogensulfate, Tetra-n-butylammonium Perchlorate, Tetra-n-butylammonium Perrhenate, Tetra-n-butylammonium Phosphate, Tetra-n-butylammonium Salicylate, Tetra-n-butylammonium Tetrafluoroborate, Tetra-n-butylammonium Tetraphenylborate, Tetra-n-butylammonium Thiocyanate, Tetra-n-butylammonium Tribromide, Tetra-n-butylammonium Triiodide, Tetraethylammonium Borohydride, Tetraethylammonium Perchlorate, Tetraethylammonium Tetrafluoroborate, Tetraethylammonium p-Toluenesulfonate, Tetraethylammonium Trifluoromethanesulfonate, Tetramethylammonium Acetate, Tetramethylammonium Borohydride, Tetramethylammonium Hexafluorophosphate, Tetramethylammonium Hydrogensulfate, Tetramethylammonium Perchlorate, Tetramethylammonium Sulfate, Tetramethylammonium Tetrafluoroborate, Tetramethylammonium p-Toluenesulfonate, Tetramethylammonium Triacetoxyborohydride, Tetra-n-propylammonium Perruthenate, Trifluoromethanesulfonic Acid Tetra-n-butylammonium Salt.

Particularly preferred antimicrobial agents include those that exhibit a substantially controlled migration through the polymeric binder to the exposed surface of the binder (and the resulting structural material) until a point of equilibrium is reached. Abrasion of the material surface during use or degradation of the exposed antimicrobial agent removes these antimicrobial agents and disrupts the established equilibrium. This stimulates additional migration of agent to the surface until a new equilibrium is reached. Several of the above mentioned antimicrobial agents exhibit this type of migration. Specific organic antimicrobial agents having this ability include 5-chloro-2-(2,4-dichlorophenoxy)phenol commercially known as triclosan; tolyl diiodomethyl sulfone; zinc pyrithione; sodium pyrithione; ortho phenylphenol; sodium ortho phenylphenol; iodo-2-propynyl butylcarbamate; poly[oxyethylene(dimethyliminio) ethylene(dimethyliminio)ethylene chloride]; propiconazole; tebuconazole; bethoxazin; thiabendazole; polyhexamethylene biguanide (i.e., PHMB); 1,3,5-triazine-1,3,5-(2H,4H,6H)-triethanol commercially available under the tradename Onyxide; and isothiazalinones such as N-butyl-1,2-Benzisothiazonlin-3-one, 4,5-dichloro-2-n-octyl-4-isothiazolin-3-one, 2-n-Octyl-4-isothiazolin-3-one, 2-Methyl-4-isothiazolin-3-one, 5-Chloro-2-methyl-4-isothiazolin-3-one.

Triclosan is particularly preferred, especially when used in conjunction with polyester as the polymeric binder.

Similarly, suitable inorganic antimicrobial agents include any of the known antibiotic metal salts and ceramics. Such metal salts include salts of silver, copper, zinc, mercury, tin, lead, bismuth, barium, cadmium, chromium, and mixtures thereof. Particularly preferred metal salts include silver acetate, silver benzoate, silver carbonate, silver iodate, silver iodide, sliver lactate, silver laurate, silver nitrate, silver oxide, silver palmitate, silver sulfadiazine, zinc oxide, barium metaborate, and zinc metaborate. Antimicrobial silver salts are particularly preferred.

Antimicrobial metal ceramics suitable for use in the practice of the invention include but are not limited to zeolites, glasses, hydroxyapatite, zirconium phosphates or other ion-exchanging ceramics. Examples of silver containing ceramics include Ionpure WPA, Ionpure ZAF, and Ionpure IPL from Ishizuka Glass Company and Ciba B5000 and Ciba B7000 from Ciba Speciality Chemicals.

The type and quantity of the antimicrobial agent in the composite structural material may vary depending upon the type and quantity of natural aggregate, polymeric binder, filler, or other additives found in the composite structural material. For example, a highly cross-linked and crystalline polymeric binder would tend to retard the migration of a bulky antimicrobial agent to the surface of the binder or exterior polymeric coating of the composite structure material. Those skilled in the art are capable of matching the appropriate antimicrobial material with the appropriate binder.

Likewise, those skilled in the art are capable of determining the appropriate loading of antimicrobial agent into the composite structural material. The primary guideline for determining the necessary quantity of antimicrobial agent is that enough of the agent should be added to the composition to provide a commercially acceptable degree of efficacy against the microbe of concern.

In preferred embodiments the antimicrobial agent is one capable of controlled migration through the polymeric binder to the surface of the composition. Such antimicrobial agents should be present in the composition at a level of at least 500 ppm based upon the total weight of the composition. Cost factors typically establish the upper limit of the quantity of antimicrobial agent at about 1% (i.e., 10,000 ppm). In most instances such migratory antimicrobial agents will be present between about 800 ppm and 7000 ppm, most preferably between about 1000 ppm and 5000 ppm based upon the weight of the cured product.

In particularly preferred embodiments the polymeric binder is polyester and the antimicrobial agent is triclosan. In this embodiment the triclosan is present in the composition in a concentration between about 800 ppm and 5000 ppm.

In a further particularly preferred embodiment the antimicrobial agent is a metal. Silver is a particularly preferred metal and may be present as a free ion or in a matrix (e.g., zeolite or glass matrix). In this embodiment the silver is present in the composition in a concentration between about 1000 ppm and 50,000 ppm, more preferably between about 5000 ppm and 20,000 ppm. Polyester is a particularly preferred polymeric binder for use with these metals.

In a still further particularly preferred embodiment the antimicrobial agent is a quaternary ammonium compound having an unsaturated reactive group (e.g., a vinyl or styrenic group) that is capable of reacting in a free radical polymerization and attaching itself to the polymeric binder. Such compounds will probably have limited migration in the polymeric binder because their reactivity essentially locks them into place within the binder. However, this type of antimicrobial agent may be applied in sufficient quantity to provide acceptable efficacy at the surface of the end product. Alternatively, and as discussed in more detail below, this type of antimicrobial agent can be selectively placed at or near the surface to provide acceptable efficacy at relatively low concentrations. Accordingly, the concentration of this type of antimicrobial agent can vary over a wide range depending upon how it is used. It is believed that concentrations between 100,000 ppm and 400,000 ppm will provide acceptable efficacy if the agent is mixed throughout the binder. Lower concentrations between about 1000 ppm and 100,000 ppm are believed to provide acceptable efficacy if the agent is primarily located at or near the surface of the end product. One particular benefit of this type of antimicrobial agent is that the reactive nature of the agent helps prevent leaching of the agent from the material.

The antimicrobial agent may be added to the composition in several ways. The particular method of adding the antimicrobial agent will depend upon the overall process and the equipment used. In general, however, the antimicrobial agent may be added in one of two ways—directly or via a carrier.

For example, the antimicrobial can be added directly to the aggregate/binder mixture before the mixture is placed in the mold. If the binder is polyester the powdered form of triclosan works well when added directly to the binder aggregate mixture. Direct addition of metal antimicrobial agents to the aggregate/binder mixture has also been shown to work well.

Alternatively, one could prepare a concentrated antimicrobial agent/polymeric binder masterbatch which is then fed into the process at the appropriate point. Triclosan/polyester masterbatches perform well.

A further alternative would include placing the antimicrobial agent in a liquid carrier and adding the agent/carrier system to the binder. For triclosan/polyester systems, one such suitable liquid carrier would be a nonionic surfactant such as Chromasist WEZ™ which is commercially available from Cognis Corporation.

If a liquid carrier system is used care should be taken to ensure that the carrier system is compatible with the overall process. For example, Chromasist WEZ™ as a carrier for triclosan results in acceptable product but can extend the cure time when using specific types of equipment or specific combinations of aggregate and binder. Given the nature of the Breton Stone processes, a certain degree of fine tuning will be necessary regardless of the antimicrobial agent and delivery method chosen.

A still further alternative would be to form an antimicrobial/colorant masterbatch which is then added to the aggregate/binder mixture just as any colorant is added to the mixture. This method has been shown to work well with triclosan in trial studies.

Yet another alternative that is believed to be well suited for use in this invention is to selectively place the antimicrobial agent near the surface of interest. This may be accomplished in one of several ways. For example, some processes may provide the placement of a thin polymeric layer between the mold and the cast aggregate/binder mixture. This polymeric layer is typically utilized as a gel coat or a mold release agent and may include the polymers identified earlier during the discussion of binders. Antimicrobial agents can be added to this thin polymeric layer if the polymer is compatible with the desired antimicrobial agent. This technique is believed to be particularly well suited for antimicrobial agents that do not migrate well through the polymeric binder.

Given the nature of the Breton Stone processes, a certain degree of fine tuning will be necessary regardless of the antimicrobial agent and delivery method chosen.

It is anticipated that in most instances the method of delivery of the antimicrobial agent will comprise some form of mixing the agent into the aggregate/binder mixture (either directly or through use of a carrier). Care should be taken to ensure that the agent is uniformly mixed into the overall composition. The mixing step will typically utilize the mixing equipment that is already used in established Breton processes. The time for mixing will vary depending upon the variables described above. If the antimicrobial agent is added directly to the aggregate and binder, a mixing time of about 5 to 20 minutes is recommended. If the antimicrobial agent is added via a carrier such as a colorant the mixing time can correspond to the mixing time usually used for that carrier.

In some processes, the aggregate/binder mixture is heated and placed under a vacuum as it is mixed. This is done to help remove air bubbles from the mixture. Care should be taken not to impose temperature and pressure conditions that could destroy the antimicrobial activity of the antimicrobial agent or cause unacceptable volitization of the agent or polymeric binder. Each agent has its own critical temperature and pressure curve and these curves are known to those skilled in the art or can be easily developed in a laboratory. If high temperatures are used a slight excess of antimicrobial agent and binder may be required to offset losses due to volitization.

Alternatively, pressure may be applied during the mixing step. Applying pressure minimizes boiling and evaporation of volatile binder components and antimicrobial agent. The cost of lost components is therefore minimized and the end product is substantially free of voids, cracks and curl. In preferred embodiments the pressure is provided as a vacuum which can vary greatly in magnitude. Acceptable vacuums can run from almost 0 to above 140 tons. The upper limit on vacuums is primarily driven by the equipment used. Accordingly, the invention anticipated and encompasses improvements in vacuum technology that will allow for even higher pressures. In most current processes the vacuum applied to the mixture is between 70 tons and 120 tons.

Once the composition is thoroughly mixed, it is placed in a mold; preferably while maintaining the application of heat and/or pressure or vacuum. The mold's contents are then vibrated. Vibration of the mixture causes the aggregate to be evenly distributed throughout the mold. Aggregate particles are vibrated into a closely packed relationship to produce a dense, substantially void-free product. The vibrators used are those typically used in a Breton Process.

The frequency and the time required to vibrate the mixture is dependent on the thickness of the piece, the formulation of the mixture, the concentration of binder, and the size and concentration of filler. Preferably, the frequency and time of vibration is selected such that vibration does not cause separation of coarser filler materials from finer filler materials and the binder.

Upon completion of vibration or simultaneously with vibration, the mixture is cured. Curing is usually facilitated by the addition of a curing agent at some point in the process. Curing agents typically used in Breton Stone processes may be used in the practice of the invention. As with the other components of claimed material, the primary requirement regarding the choice of curing agent is that it should be compatible with the polymeric binder and antimicrobial agent.

Those skilled in the art realize that the curing step is not an "on and off" step but an event that occurs over a continuum. In fact, some curing can occur as early as the mixing step. For ease of discussion, however, the curing step is usually regarded as a separate step because it is normally the rate limiting step in a process and because the cure rate can be adjusted by adjusting process parameters.

Although the curing step is the rate-limiting step in most processes, those skilled in the art usually prefer not to increase the temperature to accelerate curing because the polymeric binder can boil, causing air bubbles in the cured product and resulting in loss of binder due to evaporation. High temperatures also cause excessive cracking and curling in slabs produced by conventional processes. If the temperature is too high, the polymeric binder will cure before the vibration and pressure cycle begins.

On the other hand, if the temperature is too low, the uncured mixture tends to abrade and dilute the mold release agent that is often applied to the mold surfaces. The cured product will then tend to stick to the abraded surfaces of the mold. As with the other steps in the process, the curing temperature must be chosen in view of the components present in the mixture. Those skilled in the art will know the critical temperatures for their binding agents, antimicrobial agents, curing agents, etc. and can set their process parameters accordingly.

In conventional processes for the manufacture of imitation natural stone products, polymerization is initiated by curing the mixture in a mold at a temperature between ambient and 200° C. Trials conducted using polyester as the polymeric binder utilized curing temperatures between about 70° C. and 100° C. Triclosan performs well at this temperature which is one of the reasons it is a preferred antimicrobial agent.

Concurrent with the application of heat and vibration, the components in the mold are placed under pressure to minimize cracking, curling, boiling and evaporation of polymer components. The exact pressure utilized is dependent on the polymer composite mixture being used and the degree of vibration applied. The minimum pressure for this process is the pressure necessary to minimize boiling and evaporation of the polymeric binder. For example, in polyester/triclosan applications, the pressure is preferably in the range of from about 70 tons to about 120 tons, more preferably in the range of from about 90 tons to about 100 tons. The pressure may be applied by a top platen or by vacuum.

If the pressure is too low, air pockets may remain in the mixture so that the resultant polymer composite product has undesirable voids. Application of pressure also assists in even distribution of binder so that pockets of uncured binder are "squeezed" out to be more evenly distributed around the surrounding filler. At lower pressures, binder may not be evenly distributed. At pressures greater than about 140 tons, there may be no further improvement in the resultant product to warrant the added cost.

With the simultaneous application of heat, pressure and vibration, a polymeric film is formed around the polymer composite product which inhibits evaporation and boiling of the uncured polymer. The polymeric film also serves to protect the surfaces of the mold from abrasion by the filler.

Nevertheless, a gel coat is often used in conventional processes to provide a better surface appearance. The antimicrobial agent may be added to the gel coat as well or a sufficient amount of antimicrobial agent may be added to the mixture to allow for the controlled migration of the antimicrobial agent to the surface of the gel coat. U.S. Pat. No. 5,919,554, commonly assigned with the present invention, discusses the use of antimicrobial agents with gel coats.

Upon completion of the curing step the cured material is removed from the mold and shaped into a finished product. Such products include tabletops, countertops, architectural facings, walkways, home furnishings, patio furniture, decorative stone, indoor and outdoor tile, flooring, mantles, bathroom fixtures, wall facings, cutting boards, sinks, showers, tubs, and imitation stone structures, among others.

As evident from the above discussion, the invention also encompasses a composite material having an appearance similar to that of natural stone comprising a natural aggregate, a polymeric binder, a curing agent, and an antimicrobial agent. Fillers and other additives may also be present in the composite material.

Each of the above components and the relative amounts of each that are present in the composite material are discussed in connection with the process steps. Those skilled in the art can readily make the transition from the process discussion to the resulting end product. Accordingly, and for the sake of brevity, the discussions related to each of the material's components will not be repeated.

EXAMPLES

Several worktops having a natural marble appearance were made in accordance with the preferred embodiments of the invention. Specifically, the natural aggregate was marble, the polymeric binder was polyester, and the antimicrobial agent was triclosan. The samples are defined by different levels of triclosan. Each sample demonstrated efficacy against five different microbes when tested using a modified version of ASTM Test Method 100.

| Sample 1 (Triclosan at 1000 ppm) | | |
| --- | --- | --- |
| Test Organism | Percent Reduction | Time of Test |
| Listeria monocytogenes | 99.2 | 24 hours |
| Staphlococcus aureus | 99.9 | 24 hours |
| Eschericia coli O157 | 99.0 | 24 hours |
| Salmonella enteritidis | >99.9 | 24 hours |
| Aspergillus niger | 99.8 | 24 hours |

| Sample 2 (Triclosan at 2000 ppm) | | |
| --- | --- | --- |
| Test Organism | Percent Reduction | Time of Test |
| Listeria monocytogenes | >99.9 | 24 hours |
| Staphlococcus aureus | 99.9 | 24 hours |
| Eschericia coli O157 | 98.2 | 24 hours |
| Salmonella enteritidis | >99.9 | 24 hours |
| Aspergillus niger | 99.3 | 24 hours |

| Sample 3 (Triclosan at 3000 ppm) | | |
| --- | --- | --- |
| Test Organism | Percent Reduction | Time of Test |
| Listeria monocytogenes | 99.0 | 24 hours |
| Staphlococcus aureus | 99.9 | 24 hours |
| Eschericia coli O157 | 98.8 | 24 hours |
| Salmonella enteritidis | 99.5 | 24 hours |
| Aspergillus niger | 99.3 | 24 hours |

| Sample 4' (Triclosan at 5000 ppm) | | |
|---|---|---|
| Test Organism | Percent Reduction | Time of Test |
| Listeria monocytogenes | 99.6 | 24 hours |
| Staphlococcus aureus | 99.9 | 24 hours |
| Eschericia coli 0157 | 96.0 | 24 hours |
| Salmonella enteritidis | 97.5 | 24 hours |
| Aspergillus niger | 99.3 | 24 hours |

| Sample 5 (Triclosan at 5000 ppm) | | |
|---|---|---|
| Test Organism | Percent Reduction | Time of Test |
| Listeria monocytogenes | 98.6 | 24 hours |
| Staphlococcus aureus | 99.9 | 24 hours |
| Eschericia coli 0157 | 99.8 | 24 hours |
| Salmonella enteritidis | 99.9 | 24 hours |
| Aspergillus niger | 99.2 | 24 hours |

The invention claimed is:

1. A composite material having an appearance similar to that of natural stone, said material comprising:
    a natural aggregate,
    a polymeric binder,
    a curing agent, and
    an antimicrobial agent, wherein the antimicrobial agent is uniformly mixed into the overall composite material, whereby the antimicrobial agent exhibits controlled migration through said polymeric binder to the surface of the composite material;
    and wherein said natural aggregate makes up between about 85% to about 96% by weight of said composite material.

2. The composite material according to claim 1 wherein said natural aggregate is selected from the group consisting of calcium carbonate, granite, quartz, feldspar, marble and quartzite and mixtures thereof.

3. The composite material according to claim 2 further comprising a filler selected from the group consisting of fumed silica, sand, clay, fly ash, cement, broken ceramics, mica, silicate flakes, broken glass, glass beads, glass spheres, minor fragments, steel grit, aluminum grit, carbides, plastic beads, pelletized rubber, ground polymer composites, wood chips, sawdust, paper laminates, pigments, colorants, and mixtures thereof.

4. The composite material according to claim 1 wherein said natural aggregate makes up between about 89% to about 93% by weight of the composite material.

5. The composite material according to claim 1 wherein the polymeric binder makes up between about 4% to about 15% by weight of the composite material.

6. The composite material according to claim 5 wherein said polymeric binder makes up between about 6% to about 10% by weight of the composite material.

7. The composite material according to claim 1 wherein said polymeric binder is selected from the group consisting of monomers, a mixture of monomers, polymers, a mixture of polymers, and a mixture of monomers and polymers.

8. The composite material according to claim 7 wherein said polymeric binder is a polymer and is selected from the group consisting of thermoplastic polymers and thermosetting polymers.

9. The composite material according to claim 8 wherein said polymeric binder is a polymer and is selected from the group consisting of polyester, vinyl ester, epoxy, phenolic resin, urethane, and mixtures thereof.

10. The composite material according to claim 7 wherein said polymeric binder is a monomer and is selected from the group consisting of acrylics, styrene, styrene derivatives, vinyl toluene, divinyl benzene, methyl acrylate, ethyl acrylate, isopropyl acrylate, butyl acrylate, 2-ethylhexyl acrylate, methyl methacrylate, ethyl methacrylate, isopropyl methacrylate, butyl methacrylate, phenols, and furans.

11. The composite material according to claim 10 wherein said monomer is selected from the group consisting of styrene, methyl methacrylate and butyl acrylate.

12. The composite material according to claim 1 wherein said antimicrobial agent is present in said composite material in a quantity between about 500 ppm and 10,000 ppm.

13. The composite material according to claim 12 wherein said antimicrobial agent is present in said composite material in a quantity between about 800 ppm and 7000 ppm.

14. The composite material according to claim 12 wherein said antimicrobial agent further comprises an antimicrobial agent selected from the group consisting of quarternary ammonium compounds, quarternary ammonium compounds having an unsaturated reactive group, metals, and mixtures thereof.

15. The composite material according to claim 14 wherein said antimicrobial agent is selected from the group consisting of triclosan, tolyl diiodomethyl sulfone, zinc pyrithione, sodium pyrithione, ortho phenylphenol, sodium ortho phenylphenol, iodo2-propynyl butylcarbamate, poly[oxyethylene(dimethyliminio) ethylene(dimethyliminio)ethylene chloride], propiconazole, tebuconazole, bethoxazin, thiabendazole, polyhexamethylene biguanide, 1,3,5-triazine-1,3,5(2H,4H,6H)-triethanol, isothiazalinones, and mixtures thereof.

16. The composite material according to claim 15 wherein the polymeric binder is polyester and said antimicrobial agent is triclosan, wherein said triclosan is present in the composite material in a quantity between about 800 ppm and 5000 ppm.

17. The composite material according to claim 1 further comprising a colorant.

18. A finished product comprising the composite material according to claim 1.

19. The finished product according to claim 18 selected from the group consisting of a tabletop, a countertop, architectural facings, walkways, home furnishings, patio furniture, decorative stone, indoor and outdoor tile, flooring, mantles, wall facings, bathroom fixtures, and imitation stone structures.

* * * * *